United States Patent

Glemser et al.

[11] Patent Number: 5,978,621
[45] Date of Patent: Nov. 2, 1999

[54] METHOD AND APPARATUS FOR MONITORING AND CONTROLLING A DEVICE COMBINATION INCLUDING A MAIN DEVICE AND AT LEAST ONE AUXILIARY DEVICE

[75] Inventors: Gerhard Glemser, Stuttgart; Werner Schuette, Stuttgar, both of Germany

[73] Assignee: Eastman Kodak Company, Rochester, N.Y.

[21] Appl. No.: 08/746,781

[22] Filed: Nov. 15, 1996

[30] Foreign Application Priority Data

Nov. 23, 1995 [DE] Germany .......................... 195 14 654

[51] Int. Cl.[6] .................................................. G03G 21/00
[52] U.S. Cl. ............................................. 399/90; 399/407
[58] Field of Search .................... 399/1, 16, 90, 399/407, 408; 358/296, 300

[56] References Cited

U.S. PATENT DOCUMENTS

| | | | |
|---|---|---|---|
| 4,515,458 | 5/1985 | Masuda et al. | 399/85 |
| 5,163,137 | 11/1992 | Yamamoto et al. | 395/325 |
| 5,172,162 | 12/1992 | Taneda | 399/408 X |
| 5,629,775 | 5/1997 | Platteter et al. | 358/296 |
| 5,678,135 | 10/1997 | Fukui et al. | 399/407 X |

*Primary Examiner*—William Royer
*Attorney, Agent, or Firm*—Lawrence P. Kessler

[57] ABSTRACT

Apparatus for monitoring and controlling a combination which includes a main device (2) and at least one auxiliary device (20). The main device (2) includes a stop button (14a), at least one drive motor (13a), and a plurality of safety switches (15a). In addition, an electrical control circuit (8), which has on the auxiliary device side an input (11) through which the auxiliary device (20) and the electrical control circuit (8) are connected to an individual signal line (21) and a ground line (23) of the auxiliary device (20), is installed in the main device (2). On the main device side, the electrical control circuit (8) has two inputs (12, 13) and two outputs (14, 15).

11 Claims, 5 Drawing Sheets

METHOD AND APPARATUS FOR MONITORING AND CONTROLLING A DEVICE COMBINATION INCLUDING A MAIN DEVICE AND AT LEAST ONE AUXILIARY DEVICE

BACKGROUND OF THE INVENTION

The invention concerns an apparatus for monitoring and controlling a combination of a main device and at least one auxiliary device, the main device having a stop button, at least one drive motor, and a plurality of safety switches, and an electrical control circuit being installed in the main device.

U.S. Pat. No. 4,515,458 describes a copier that is connected to a sorting unit as an auxiliary device. The copier monitors the energy to the sorting unit. If the sorting unit should be disconnected from line power, the sheets are transported out of the copier in such a way that they do not enter the sorting unit. Provided in both the copier and the sorting unit are electrical circuits which monitor the operation of the copier and the sorting unit. The two circuits are interconnected via corresponding lines. The sorting unit has door switches which interrupt power to the sorting unit when a door is open. The circuit in the sorting unit communicates to the input of the circuit in the copying unit that power to the sorting unit has been interrupted. The circuit in the copying unit actuates corresponding means so that the sheets being processed are transported into a non-sort tray that is not located in the sorting unit.

U.S. Pat. No. 5,163,137 discloses an interface for a copying system that consists of a copy machine and one or more peripheral devices. The CPU of the copy machine is connected to the peripheral devices with two lines ($L_1$ and $L_2$). $L_1$ connects the output of the CPU of the copy machine to the input of the CPU of the peripheral devices, and conversely the outputs of the CPUs of the peripheral devices are connected via line $L_2$ to the input of the CPU of the copy machine. The interface is used to monitor and control the peripheral devices. Data are interchanged between the copy machine and the peripheral devices in accordance with a specific data format. The data are composed of an address block, a data block, and a check block. It is evident that because of the defined data format, peripheral devices, including possibly those of other manufacturers, must be adapted to the language or data format of the CPU of the copier.

SUMMARY OF THE INVENTION

It is the object of the invention to create a control circuit with which combinations of devices of the same or different manufacturers can be controlled in a simple and reliable manner. A further object of the invention is for the auxiliary device(s) that is/are connected to be able to communicate with the main device regardless of the communication protocol used in the main device. In addition, the auxiliary device is to be easily connectable to the main device.

This is achieved, according to the invention, in that the electrical control circuit has, on the auxiliary device side, an input through which the auxiliary device and the electrical control circuit are connected by an individual signal line and a ground line of the auxiliary device. The advantage of the apparatus according to the invention is that only one signal line, through which the operating status of the auxiliary device is transmitted to the control circuit in the main device, is required between the auxiliary device and the main device. Multiple inputs and outputs are provided on the main device side, a first input having a signal line through which the operating status of a drive motor in the main device can be conveyed. In addition, a first output of the control circuit is connected in parallel with the stop button of the main device, and a second output is connected in series with at least one safety switch of the main device. On the main device side the control circuit is connected via the wiring in the main device. In addition, the auxiliary device stops the main device without thereby causing a paper jam or paper loss. After a stopped condition of the auxiliary device is communicated to the main device, the sheets still in the main device are transported out of the main device before it is shut down.

Further advantageous developments of the invention are evident from the claims.

BRIEF DESCRIPTION OF THE DRAWINGS

The subject of the invention will be described with reference to the embodiment depicted in the drawings, in which.

DETAILED DESCRIPTION OF THE INVENTION

Figure 1:
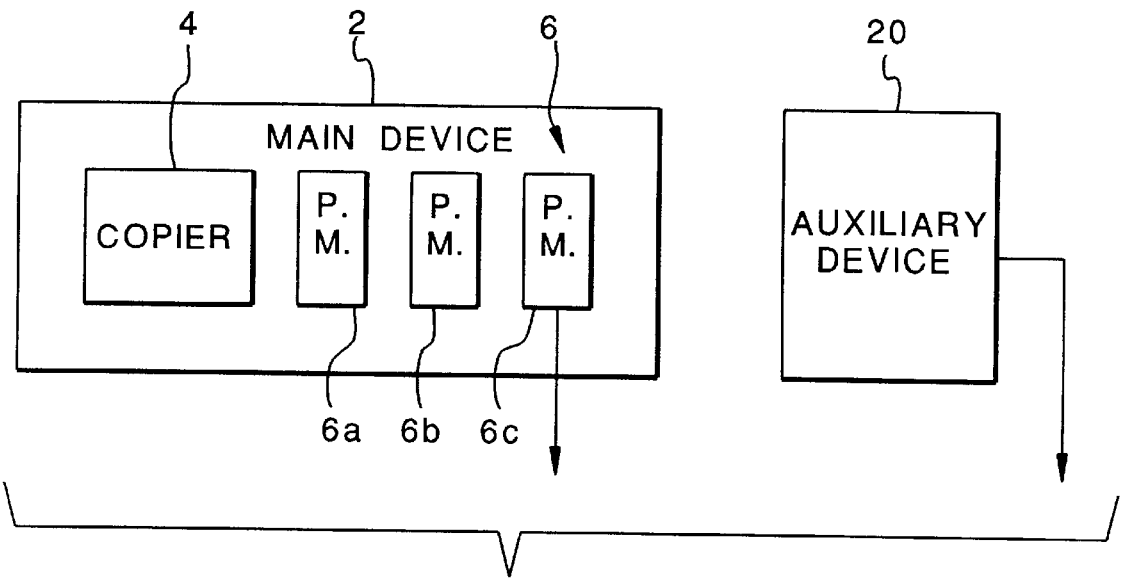
FIG. 1 shows a schematic structure of a device combination including a main device and an device.

The schematic structure of a device combination including a main device 2 and an auxiliary device 20 is depicted in FIG. 1. The main device consists either of a copier 4 alone, or also of a device combination including a copier and at least one own-brand downline processing mechanism 6. In the embodiment shown in FIG. 1, three additional own-brand downline processing mechanisms 6a, 6b, and 6c are indicated. The term "own-brand downline processing mechanism" is understood to mean that copier 4 and downline processing mechanisms 6a, 6b, 6c connected to it in main device 2 derive from the same device manufacturer. The device combination of the main device is distinguished by the fact that the individual devices communicate with one another, and also understand each other. As a rule the data lines within a main device are configured as multiconductor cables (data buses), on which data are interchanged according to a device-specific format.

Auxiliary device 20 is an independent device that does not understand the language of the main device. "Independent device" means that auxiliary device 20 can also be manually loaded with a job in order then to process that job. In addition, an auxiliary device must be capable of processing the output of a predecessor in the process. For example, auxiliary device 20 can be a peripheral processing unit that is used for the production of small books or brochures. Utilization of the auxiliary device is not in any way confined to the production of books; folder units, stapler units, sorter units, etc. are also possible. In this connection, as already mentioned, one important basic prerequisite must be met Auxiliary device 20 must be able to process the output coming from main device 2 or predecessors.

Figure 2:
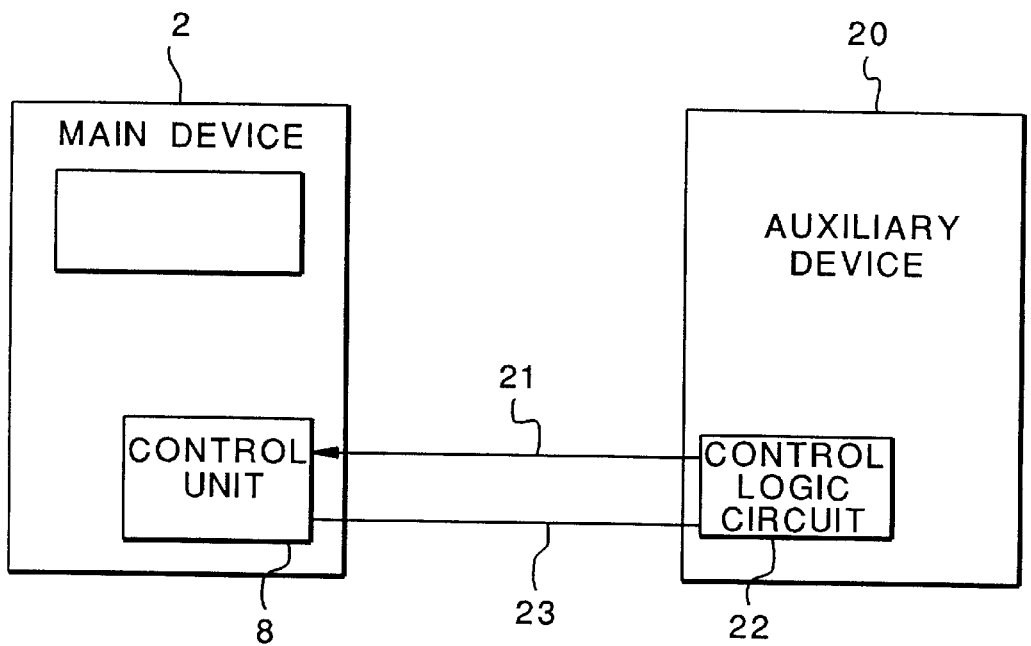
FIG. 2 shows the connection of the auxiliary device to the main device.

The structure of the individual components of main device 2 (copier 4, peripheral processing units 6a, 6b, 6c) and of auxiliary device 20 will not be discussed in further detail here, since they are well known in the prior art In order for auxiliary device 20 to be able to deliver status information to the main device, auxiliary device 20 is connected to main device 2 via a single signal line 21 (see FIG. 2). Installed in main device 2 is an electrical control circuit 8 which receives the signal of the auxiliary device. Control circuit 8 is built into the last peripheral processing unit of main device 2. If no peripheral processing units are provided, control circuit 8 is built directly into copier 4. A control logic unit 22, which is connected via the aforementioned signal line 21 and a grounding connection 23 to electrical control circuit 8 in main device 2, is provided in auxiliary device 20.

Figure 3:
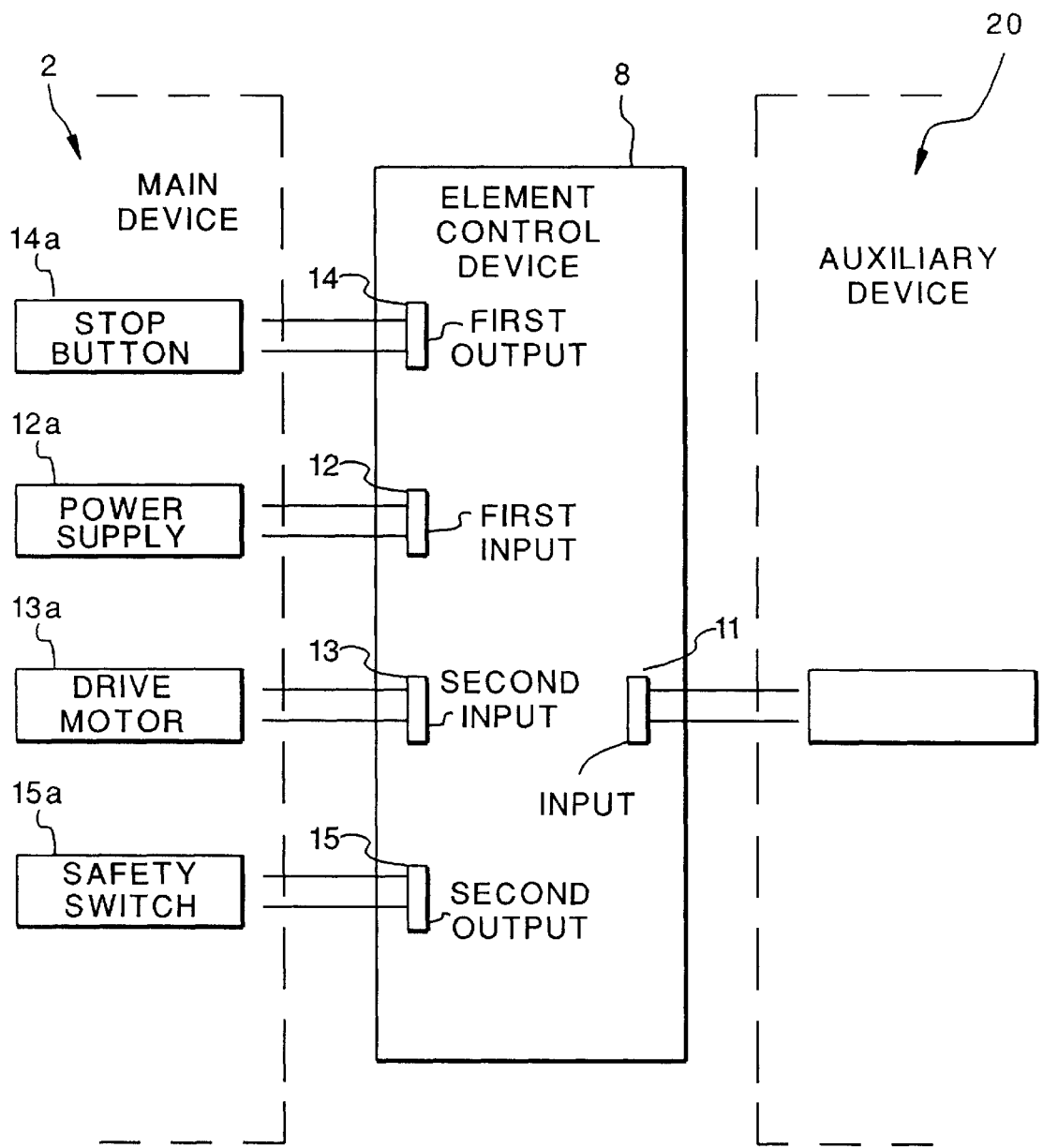
FIG. 3 shows a schematic depiction of the electrical control circuit, with the connections to the device and the main device.

Electrical control circuit 8, with inputs and outputs, is depicted schematically in FIG. 3. On the auxiliary device 20 side, electrical control circuit 8 possesses one input 11. On the main device side there is a first input 12 for a power supply 12a of electrical control circuit 8, and a second input 13 through which the operating status of a drive motor 13a in the auxiliary device is communicated to control circuit 8. In addition there is a first output 14 that is connected in parallel with a stop button 14a of main device 2. A second output 15 is connected in series with at least one safety switch 15a of main device 2.

Figure 4A:
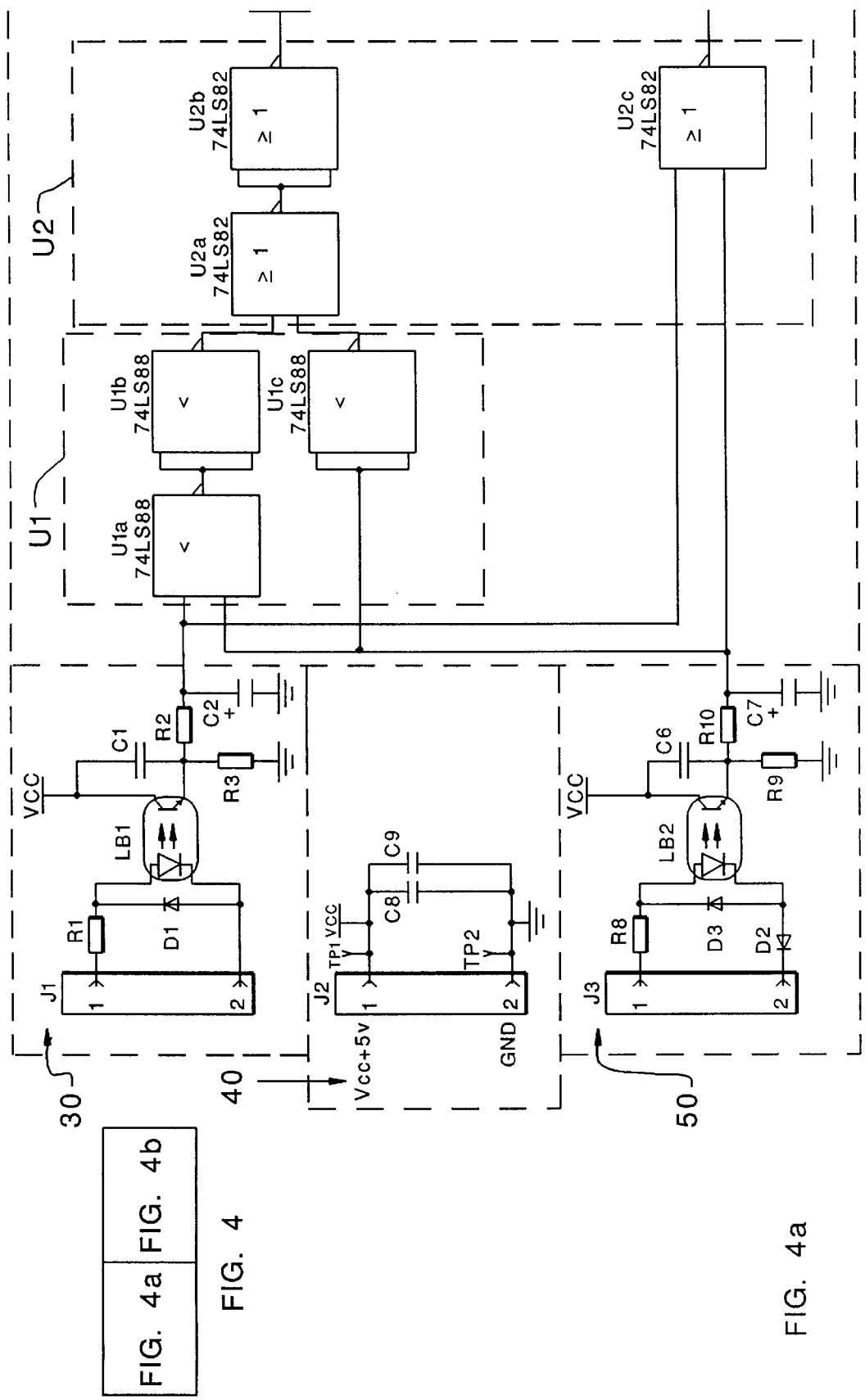
FIG. 4 shows circuit diagram of the electrical control circuit.
Figure 4B:
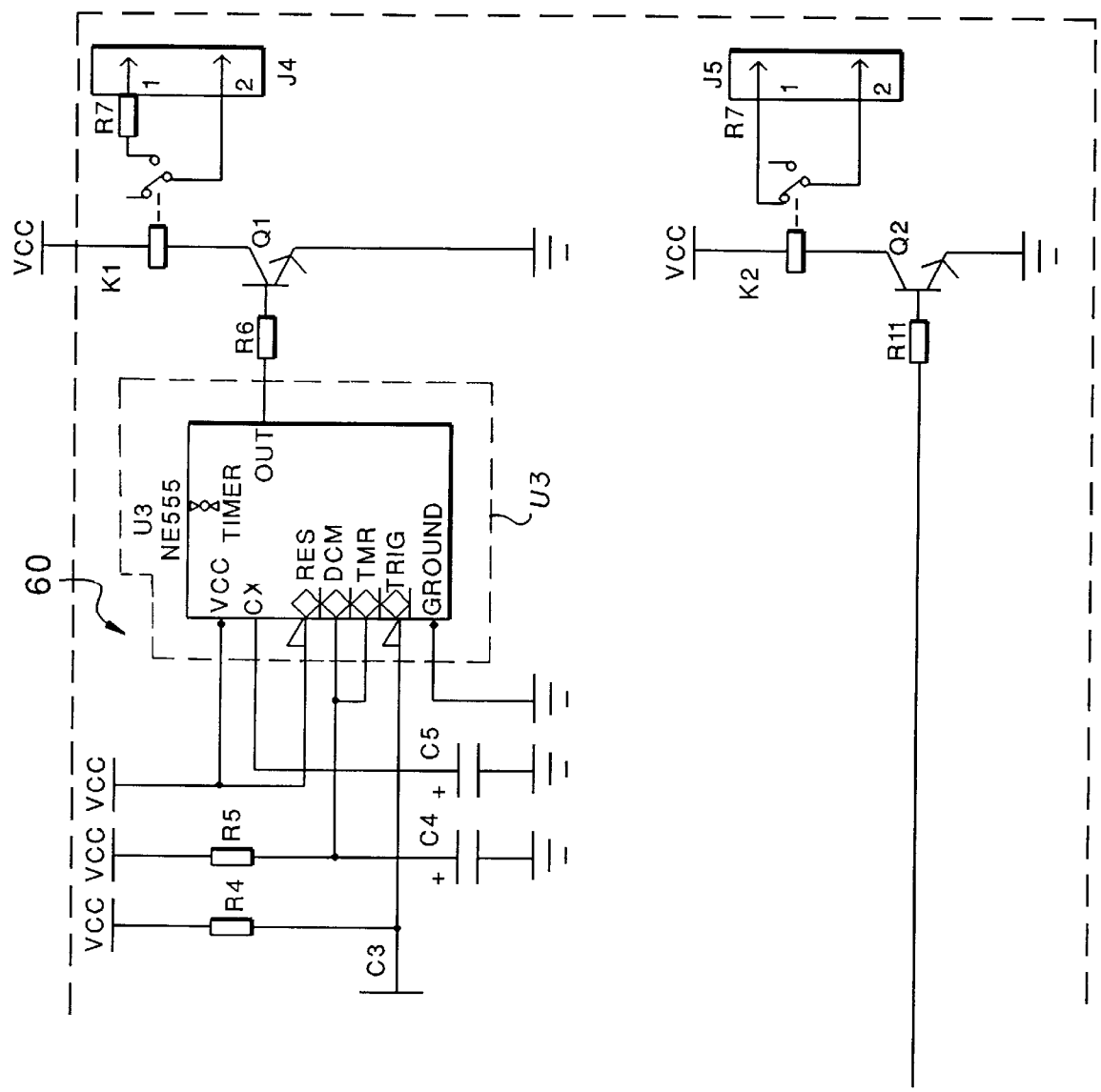

FIG. 4 shows a detailed layout of control circuit 8. Control circuit 8 is made up substantially of four subassemblies: a first input subassembly 30 from auxiliary device 20, a second input subassembly 40 from main device 2 and a third input subassembly 50 from main device 2, and a logic group 60 with first output 14 and second output 15.

The signals from auxiliary device 20 pass via a first connector J1 into first input subassembly 30. "READY" status of auxiliary device 20 is indicated by a logical "high" level, and "NOT READY" status by a logical "low" level. The edge of the signal transition from the high level to the low level indicates that the auxiliary device has entered "NOT READY" status. The signal is coupled into logic group 60 via an optical coupler LB1. Provided between the terminals of connector J1 is a diode D1, which protects optical coupler LB1 from voltage spikes. In addition, the optical coupler is also preceded by a protective resistor R1. A noise suppression capacitor C1 and a load resistor R3 are provided at the output of optical coupler LB1. This is followed by a low-pass filter including a resistor R2 and a capacitor C2, which implements a time delay. This prevents short-term level fluctuations from passing through.

Second input subassembly 40 represents the power supply for logic group 60. Second input subassembly 40 is supplied with +5 V voltage via a connector J2. In addition, a first C8 and second capacitor C9 are provided between the terminals of connector J2, acting as blocking capacitors for voltage spikes.

Third input subassembly 50 provides logic group 60 with information about the status of the drive motor in the last downline processing mechanism of main device 2. If main device 2 consists only of a copier 4, the status of the drive motor of copier 4 is used. It is self-evident that any other component in main device 2 that is powered when main device 2 is in READY status can also be used for monitoring. The signals from main device 2 pass via a third connector J3 into third input subassembly 50. "READY" status of main device 2 is indicated by a logical "high" level, and "NOT READY" status by a logical "low" level. In this instance the signal transition between the two levels is not determined, but only the "READY" or "NOT READY" status. The signal is coupled into logic group 60 via an optical coupler LB2. Provided between the terminals of connector J3 is a diode D3 which protects optical coupler LB2 from voltage spikes. In addition, the optical coupler is also preceded by a protective resistor R8. A second diode D2 protects optical coupler LB2 from polarity reversal. A noise suppression capacitor C6 and a load resistor R9 are provided at the output of optical coupler LB2. This is followed by a low-pass filter including a resistor R10 and a capacitor C7, which implements a time delay. This prevents short-term level fluctuations from passing through.

Logic group 60 is made up substantially of a NAND module U1, a NOR module U2, and a timer module U3. NAND module U1 possesses a first NAND gate U1a, a second NAND gate U1b, and a third NAND gate U1c. NOR module U2 also consists of a first NOR gate U2a, a second U2b, and a third NOR gate U2c. The output of the first input subassembly is connected to the input of first NAND gate U1a and to the input of third NOR gate U2c. The output of third input subassembly 50 is connected to the second input of third NOR gate U2c, the second input of first NAND gate U1a, and the first and second input of third NAND gate U1c. The output of first NAND gate U1a is applied to the two inputs of second NAND gate U1b. The output of second NAND gate U1b and third NAND gate U1c is applied to the first input and second input, respectively, of first NOR gate U2a. The output of first NOR gate U2a is applied to the two inputs of second NOR gate U2b. The output of second NOR gate U2b passes via a high-pass filter including a capacitor C3 and a resistor R4 to a TRIG input of timer module U3. In addition, the timer module is preceded by a time delay circuit including a resistor R5 and capacitors C4 and C5. The OUT output of timer module U3 passes via a resistor R6 to a transistor Q1, the base of which is connected to a relay K1 that, in the closed position, stops main device 2. The stop signal passes via a resistor R7 to connector J4.

The OUT output of third NOR gate U2c passes via a resistor R11 to a transistor Q2, the base of which is connected to a relay K2 that, in the open position, simulates an open safety switch. The signal passes via a connector J5 to the corresponding safety switch.

The signal processing inside logic group 60 requires no further discussion, since it is clear to a person skilled in this art, on the basis of the circuit disclosed in FIG. 4, how the signals are processed inside logic group 60.

Figure 5:
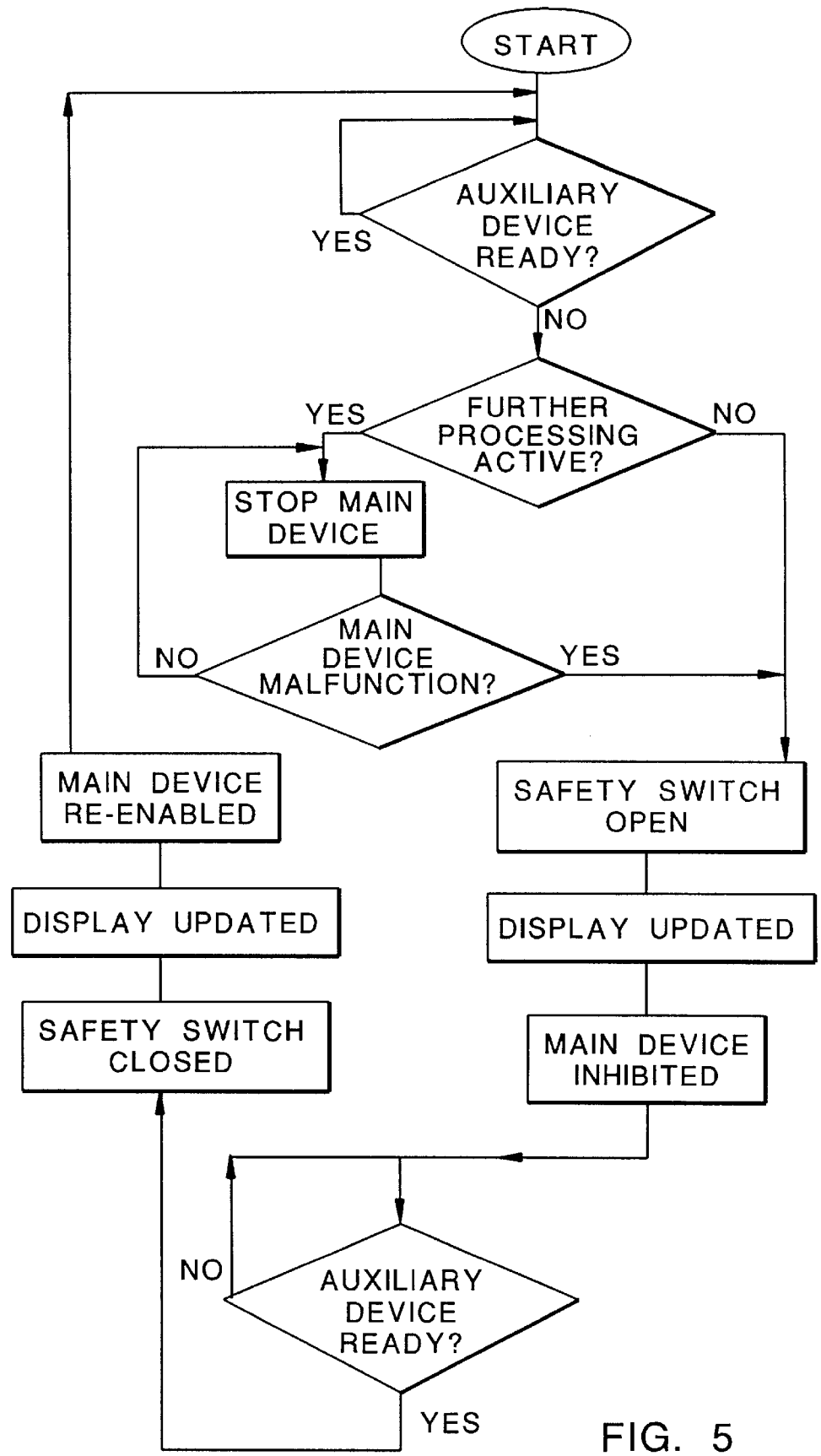
FIG. 5 shows a flow diagram of the method for monitoring and controlling the interaction between the main device and auxiliary device.

The flow diagram depicted in FIG. 5 describes the process sequence for controlling a combination including one main device with one auxiliary device. Main device 2 possesses a start button (not depicted), by means of which operation of the system including main device 2 and auxiliary device 20 is started. Control circuit 8 then checks whether auxiliary device 20 is in "READY" status. If so, copying and peripheral processing in the attached auxiliary device 20 proceed in accordance with the job entered. In the event of a malfunction, auxiliary device 20 sends a signal for a stop condition to the control circuit. Based on this signal, control circuit 8 detects that auxiliary device 20 is in "NOT READY" status. The control circuit also checks whether or not the last peripheral processing unit WVE in main device 2 is "ACTIVE". If main device 2 consists only of a copier 4, its status governs the status determination. Hereinafter only the term "peripheral processing unit WVE" will be used, regardless of whether the copier or a peripheral processing unit WVE is the last unit in terms of the processing sequence.

If control circuit 8 detects that the last peripheral processing unit WVE is not "ACTIVE", the control circuit simulates an open safety switch. A display (not depicted) provided on main device 2 is updated, and the main device is inhibited for further operation. The control circuit continuously checks the operating status of auxiliary device 20.

If, however, control circuit 8 detects that the last peripheral processing unit WVE is still "ACIIVE", operation of main device 2 is stopped. The control circuit simulates an open safety switch. A display (not depicted) provided on main device 2 is updated, and the main device is inhibited for further operation. The control circuit continuously checks the operating status of auxiliary device 20.

If the control circuit detects that the auxiliary device has returned to "READY" status, (i.e. the malfunctions in the auxiliary device have been remedied by operating personnel), the safety switch is once again closed, and the display on the main device is updated. The start button on the main device is then re-enabled, and the system including main device and auxiliary device can be started up again for further processing.

The present invention was described with reference to a preferred embodiment, but modifications can of course be made by one skilled in the art, without departing the scope of the claims which follow.

We claim:

1. Method for monitoring and controlling a combination of a main device (2) and at least one auxiliary device (20), characterized by the steps:

sending a signal representative of an operating status of at least one auxiliary device (20) via a single signal line (21) to a control circuit (8) in the main device (2);

switching off a start button of the main device (2), to inhibit operation of the main device, if the auxiliary device (20) is in "NOT READY" status;

simulating an open safety switch (15*a*) if the main device (2) is in "NOT READY" status; and closing the safety switch (15*a*), and indicate that the main device (2) is ready for operation, if the auxiliary device (20) is in "READY" status.

2. Monitoring and controlling method according to claim 1, in which the main device (2) is made up of a copier (4), characterized by the following steps:

determining an operating status of the last auxiliary device (20) of the at least one auxiliary device;

switching off the copier (4) if such last auxiliary device (20) is in "NOT READY" status.

3. Monitoring and controlling method according to claim 1, in which the main device (2) includes a copier (4) and at least one peripheral processing unit (6), the at least one peripheral processing unit being arranged in line in accordance with a downline process, characterized by the following steps:

determining an operating status of the last of the at least one auxiliary device (20); and switching off the main device (2) if such last auxiliary device (20) is in "NOT READY" status.

4. Monitoring and controlling method according to claim 3, characterized by the step of indicating the main device (2) is not ready to operate.

5. Apparatus for monitoring and controlling a combination of a main device (2) and at least one auxiliary device (20), the main device (2) having, a stop button (14*a*), at least one drive motor (13*a*), and a plurality of safety switches (15*a*), and an electrical control circuit (8) in the main device (2), characterized in that the electrical control circuit (8) has, on the auxiliary device side, an input (11) through which the at least one auxiliary device (20) and the electrical control circuit (8) are connected to an individual signal line (21) and a ground line (23) of the at least one auxiliary device (20).

6. The monitoring and controlling apparatus according to claim 5, characterized in that the main device (2) is made up of a copier (4) or a copier with at least one peripheral processing unit (6), the at least one peripheral processing unit being arranged in line in accordance with a downline process; and that the copier (4) or the last peripheral processing unit of the at least one peripheral processing unit takes over the power supply (12*a*) for an electrical control circuit (8), the power supply (12*a*) being connected to the first input (12) of the electrical control circuit.

7. The monitoring and controlling apparatus according to claim 5, characterized in that the electrical control circuit (8) has multiple inputs and outputs (12, 13, 14, 15) on the main device side, a first input (12) connecting the electrical control circuit (8) to a power supply (12*a*), and a second input (13) having a signal line via which the status of the at least one drive motor (13*a*) of the main device (2) can be determined.

8. The monitoring and controlling apparatus according to claim 7, characterized in that a first output (14) of the electrical control circuit (8) is connected in parallel with the stop button (14*a*) of the main device (2).

9. The monitoring and controlling apparatus according to claim 7, characterized in that a second output (15) of the electrical control circuit (8) is connected in series with at least one safety switch (15*a*) of the main device (2).

10. The monitoring and controlling apparatus according to claim 7, characterized in that the input (11) on the auxiliary device side and the second input (13) on the main device side are each coupled by means of an optical coupler (LB1, LB2) to a logic subassembly (60).

11. The monitoring and controlling apparatus according to claim 10, characterized in that the logic subassembly (60) includes a NAND module (U1), a NOR module (U2), and a timer module (U3).

* * * * *

UNITED STATES PATENT AND TRADEMARK OFFICE
CERTIFICATE OF CORRECTION

PATENT NO.: 5,978,621
DATED: November 2, 1999
INVENTOR(S): Gerhard Glemser Werner Schuette It is certified that error appears in the above-identified patent and that said Letters Patent is hereby corrected as shown below:

Cover Page - Line [30] Foreign Application Priority Data
Delete "195 14 654" and insert therefor --195 43 654--.

Signed and Sealed this

Nineteenth Day of September, 2000

Attest:

Q. TODD DICKINSON

Attesting Officer          Director of Patents and Trademarks